United States Patent
Bouknight, Jr.

(10) Patent No.: US 10,803,288 B2
(45) Date of Patent: Oct. 13, 2020

(54) METHODS AND SYSTEMS FOR ACCESSING COMPUTING SYSTEMS WITH BIOMETRIC IDENTIFICATION

(71) Applicant: INTERNATIONAL BUSINESS MACHINES CORPORATION, Armonk, NY (US)

(72) Inventor: Wendell J. Bouknight, Jr., Clayton, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 158 days.

(21) Appl. No.: 15/960,910

(22) Filed: Apr. 24, 2018

(65) Prior Publication Data

US 2019/0325193 A1    Oct. 24, 2019

(51) Int. Cl.
*G06K 9/00* (2006.01)
*G06F 3/0488* (2013.01)
*G06F 3/0486* (2013.01)

(52) U.S. Cl.
CPC ........ *G06K 9/00087* (2013.01); *G06F 3/0486* (2013.01); *G06F 3/0488* (2013.01)

(58) Field of Classification Search
None
See application file for complete search history.

(56) References Cited

U.S. PATENT DOCUMENTS

| | | | |
|---|---|---|---|
| 9,195,388 B2 | 11/2015 | Shepherd et al. | |
| 9,268,966 B1 | 2/2016 | Amacker et al. | |
| 9,372,978 B2 | 6/2016 | Dellinger et al. | |
| 9,632,578 B2 | 4/2017 | Bae et al. | |
| 9,740,832 B2 | 8/2017 | Shi | |
| 2008/0310602 A1 | 12/2008 | Bhupati | |
| 2011/0247065 A1 | 10/2011 | Melnyk | |
| 2012/0235790 A1 | 9/2012 | Zhao et al. | |
| 2013/0055169 A1 | 2/2013 | Wright et al. | |
| 2016/0210467 A1 | 7/2016 | Mehrab et al. | |
| 2016/0259413 A1* | 9/2016 | Anzures | G06F 3/016 |
| 2016/0323282 A1* | 11/2016 | Chen | G06F 21/32 |
| 2019/0138740 A1* | 5/2019 | Ricknas | G06F 21/62 |

* cited by examiner

*Primary Examiner* — Leon Viet Q Nguyen
(74) *Attorney, Agent, or Firm* — Griffiths & Seaton PLLC (57) ABSTRACT

Embodiments for managing computing systems by one or more processors are described. Content rendered by a display device of a computing system is prevented from being modified. An object is detected within a proximity of the display device. The object is associated with an individual. A biometric identification process is caused to be performed on the individual while the object is within the proximity of the display device. Based on the biometric identification process, the content is allowed to be modified while the object is within the proximity of the display device.

15 Claims, 7 Drawing Sheets

METHODS AND SYSTEMS FOR ACCESSING COMPUTING SYSTEMS WITH BIOMETRIC IDENTIFICATION

BACKGROUND OF THE INVENTION

Field of the Invention

The present invention relates in general to computing systems, and more particularly, to various embodiments for accessing computing systems with biometric identification.

Description of the Related Art

Computing devices (or systems) are often used to display various types of content, such as information/data, images, etc., in situations in which it's desirable that at least some people who view the content and/or are new to the device are not able to make any modifications or changes to the content. For example, in a public place, such as an airport terminal or train station, computing terminals, or at least display devices/screens thereof, may be used to display various types of information, such as schedules, delays, destinations, or general travel-related information.

Typically, this information cannot be changed by any individual who encounters the display. Rather, the display may be accessed from a remote terminal (e.g., in a controlled access area) or a login/security process may be required (e.g., at a terminal near the display).

SUMMARY OF THE INVENTION

Various embodiments for managing computing systems by one or more processors are described. In one embodiment, by way of example only, a method for managing a computing system, again by one or more processors, is provided. Content rendered by a display device of a computing system is prevented from being modified. An object is detected within a proximity of the display device. The object is associated with an individual. A biometric identification process is caused to be performed on the individual while the object is within the proximity of the display device. Based on the biometric identification process, the content is allowed to be modified while the object is within the proximity of the display device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, computing devices (or systems) are often used to display various types of content, such as information/data, images, etc., in situations in which it's desirable that at least some people who view the content and/or are new to the device are not able to make any modifications or changes to the content. As such, the devices, or at least the content rendered on the displays, are held in a "locked" state so that the content cannot be changed, or perhaps such that some of the content may not be fully accessed and/or utilized.

As one example, various types of information is often displayed using computing devices at public places, such as airport terminals and train stations. This information may include schedules, delays, destinations, and other travel-related information. Generally speaking, it is undesirable for anyone (e.g., travelers) walking by to have the ability to make any changes to the information displayed. Similarly, work places may have various types of content, such as information related to new products, displayed in lobbies or other areas where visitors may spend time. Typically, such content can only be changed by authorized personnel (e.g., employees with an appropriate security clearance).

In such situations, typically the computing device and/or the display screen must be "unlocked" in some manner in order for any changes to the content to be made. This may be accomplished via a remote computer terminal or in situations in which a terminal is located near the display by requiring some sort of security clearance process (e.g., logging in, entering a password, etc.).

However, using conventional systems, there is no way for an authorized user to easily and quickly make changes to the content. That is, the authorized user typically has to pass whatever security procedures are being used, go to a remote terminal, and/or communicate with other personnel in order for the changes to be made.

To address these needs, some embodiments described herein provide methods and systems for managing computing systems (or devices) in such a way that authorized users are easily and quickly able to access and/or make changes to at least some content rendered by a computing system (and/or a display device thereof) and/or the data associated with the rendered content.

In some embodiments, this is accomplished by utilizing a biometric identification process that is initiated when an object is detected within a proximity of (e.g., in contact with) a display device of the system. In at least some embodiments, the computing system may be accessed and/or changes to the content (and/or associated data) are allowed only if the individual is determined to be an authorized user (and/or have the appropriate security clearance) and only while the object remains within the proximity of the display device.

As one example, the computing system may include a fingerprint scanner, and when an object (e.g., a finger) is detected making contact with the fingerprint scanner, a fingerprint scanning process is performed to determine whether or not the individual is authorized to, for example, access and/or make any changes to the content. If the individual is authorized, at least some of the content on the display device (and/or at least some of the data on the computing system associated with the content) is "unlocked" so that it may be accessed and/or changes to it may be made. The content may remain unlocked only so long as the finger of the individual remains in contact with the fingerprint scanner. That is, when the finger is detected as being removed from the fingerprint scanner, the content is again "locked" so that it may no longer be accessed and/or no additional changes may be made.

The biometric identification may be performed using an apparatus (e.g., biometric device) that is integrated into the display device. For example, in some particular embodiments, the computing system includes a touchscreen display device that has fingerprint scanning capabilities (e.g., the fingerprint scanner is integrated into the display device). In such embodiments, the content (and/or computing system) may be unlocked when a finger is detected as making contact with the touchscreen and the subsequent fingerprint scanning process indicates that the individual is an authorized user (e.g., authorized to access and/or make changes to the content). The individual may be able to access and/or make changes to and/or manipulate the content so long as his/her finger remains in contact with the touchscreen. However, once the individual's finger is detected as being removed from the touchscreen, the content is again "locked."

In some embodiments, the content is rendered on a portion of the touchscreen configured to perform a fingerprint scan. That is, the individual may touch the portion of the touchscreen being used to render the content he/she wishes to change, and that same portion of the touchscreen may then be utilized to perform the biometric identification process. While maintaining contact with the touchscreen, the individual may be able to make changes (e.g., "drag" the content to a different portion of the screen).

In particular, in some embodiments, a method, by one or more processors, for managing computing systems, again by one or more processors, is provided. Content rendered by a display device of a computing system is prevented from being modified. An object is detected within a proximity of the display device. The object is associated with an individual. A biometric identification process is caused to be performed on the individual while the object is within the proximity of the display device. Based on the biometric identification process, the content is allowed to be modified (and/or accessed) while the object is within the proximity of the display device.

The detecting of the object within the proximity of the display device may include detecting the object in contact with (e.g., direct contact with) a portion of the display device. The content may be rendered on the portion of the display device.

The object may be detected moving from the portion of the display device to a second portion of the display device. The content may be caused to be modified in response to the detecting of the object moving from the portion of the display device to the second portion of the display device.

The object may be a portion of a body of the individual. The object may be a finger of the individual. The biometric identification process may include a fingerprint scan.

The allowing of the content to be modified while the object is within the proximity of the display device may include detecting the object moving beyond the proximity of the display device and re-preventing the content from being modified after the detecting of the object moving beyond the proximity of the display device.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
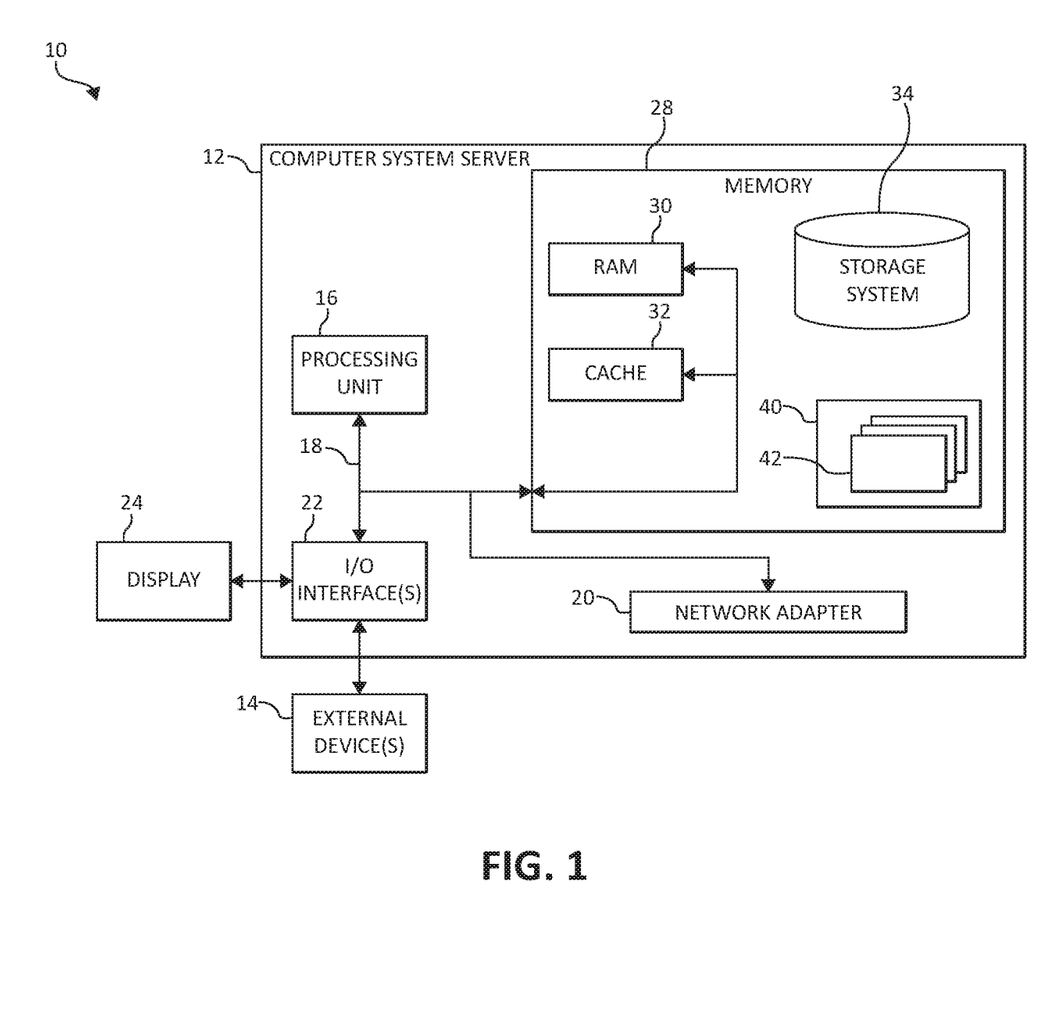
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
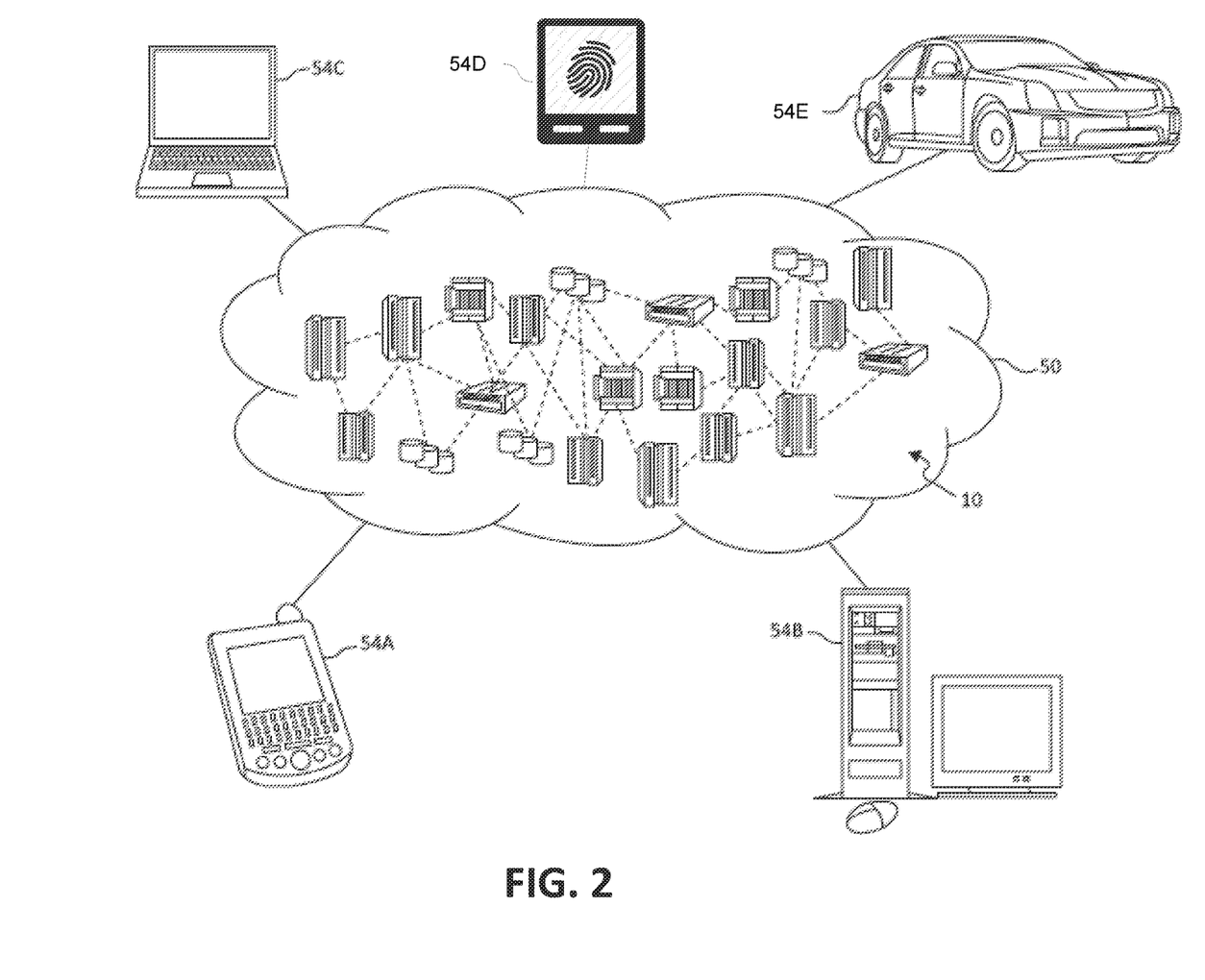
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, laptop computer 54C, biometric device (e.g., a fingerprint scanner) 54D, and vehicles (e.g., automobiles, aircraft, watercraft, etc.) 54E may communicate. Although biometric device 54D is shown as being a separate device, it should be understood that in some embodiments biometric device 54D may be integrated into the other devices/systems 54A, 54B, 54C, and 54E (e.g., within a display device of another computing system).

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-E shown in FIG. 2 are intended to be illustrative only and that computing nodes 10 and cloud computing environment 50 can communicate with any type of computerized device over any type of network and/or network addressable connection (e.g., using a web browser).

Figure 3:
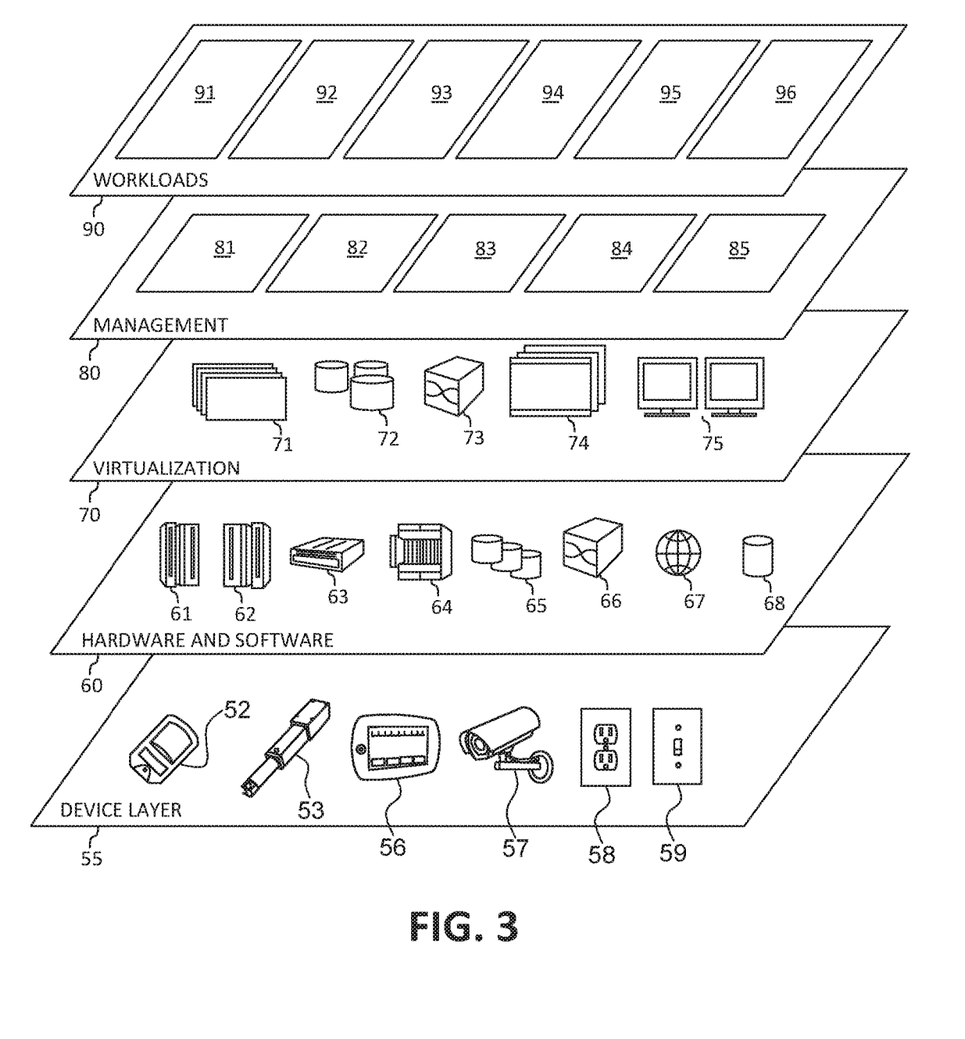
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, biometric devices, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing computing systems as described herein. One of ordinary skill in the art will appreciate that the workloads and functions 96 for managing computing systems may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As described above, some embodiments described herein provide methods and systems for managing computing systems, or more particularly, methods and systems for allowing access to computing systems using biometric identification. In some embodiments, (authorized) users are easily and quickly able to access and/or make changes to at least some content rendered and/or the data associated with the rendered content. In some embodiments, this is accomplished by utilizing a biometric identification process that is initiated when an object is detected within a proximity of (e.g., in contact with) a display device of the system. In at least some embodiments, access and/or changes to the content (and/or associated data) are allowed only if the individual is determined to be an authorized user (and/or have the appropriate security clearance) and the changes may only be made while the object remains within the proximity of the display device.

Figure 4:
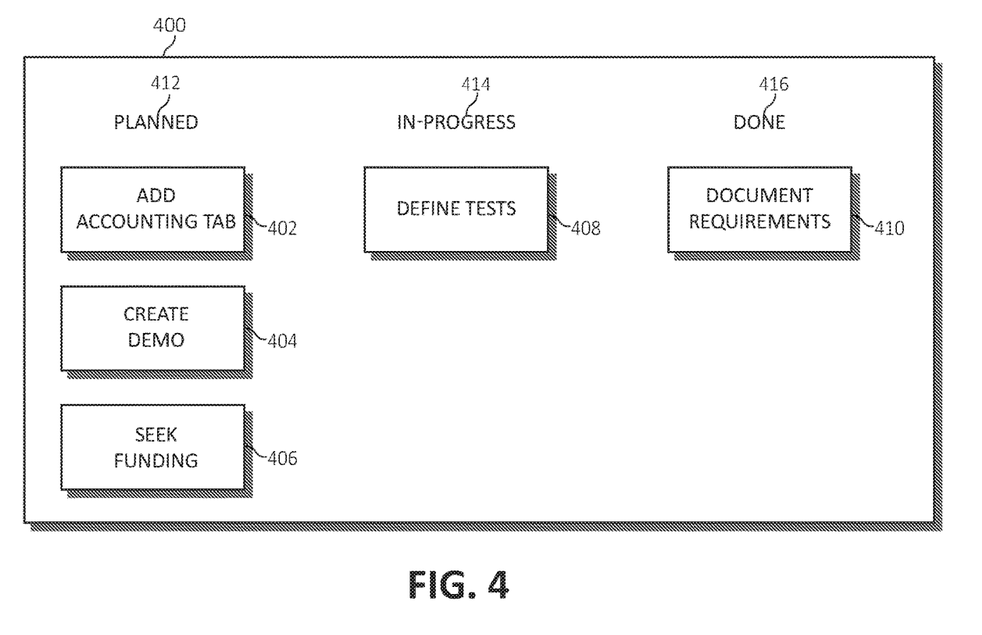
FIGS. 4-10 are plan views of a display device of a computing system, illustrating various aspects of functionality described herein, according to an embodiment of the present invention.

FIG. 4 illustrates a display device 400 according to some embodiments of the present invention. The display device 400 may be any suitable device configured to render (or display) content and/or information associated with a computing system or device, such as those described above. In some embodiments, the display device 400 is a display screen, such as an active-matrix liquid-crystal display (AM-LCD), a thin-film-transistor LCD (TFT LCD), an active-matrix organic light-emitting diode (AMOLED) display, etc. In some embodiments, the display device 400 is a touchscreen, as is commonly understood in the art (e.g., mutual capacitance or self-capacitance). In some particular embodiments, the display device 400 is configured to be utilized in a biometric identification process. For example, the display device 400 may have a biometric device, such as biometric device 54D in FIG. 2, integrated therein. The biometric identification process may include a fingerprint scanning. However, it should be understood that other types of biometric identification may be used in other embodiments, such as face recognition, palm print/scanning, hand geometry, DNA, iris and/or retina recognition, odor/scent detection, etc. Further it should be understood that the biometric identification process may be performed, at least in part, by biometric devices that are external (or separate from) the display device 400.

In the example shown in FIG. 4, various content (or information) is shown as being displayed (or rendered) by the display device 400, in particular, content pieces 402-410. In the particular embodiment shown, the content pieces 402-410 are respectively labeled as "Add Accounting Tab," "Create Demo," "Seek Funding," Define Tests," and "Document Requirements." Also in the example shown in FIG. 4, the content pieces 402-410 are organized into columns (or categories) 412, 414, and 416, respectively labeled "Planned," "In-Progress," and "Done." As such, it should be understood that the example shown is intended to represent the displaying of the status of various tasks or projects, with each of the content pieces 402-410 representing one of the tasks and the column 412-416 in which each task is locating representing the current status of that task. However, it should be understood that the embodiment described herein may be applied to other types of content, such as text, images, spreadsheets, applications (e.g., applications icons/widgets), etc. and/or data stored on a computing system associated with the content.

As shown in FIG. 4, the display device 400 (and/or the content pieces 402-410) is in a "locked" state such that the content (and/or data associated with the content) may not be changed or manipulated. It should be noted that in some embodiments, when the display device 400 (and/or the computing system) is in the locked state, the content (i.e., content pieces 402-410) is rendered by the display device 400 (e.g., as opposed to a login screen or "screen saver" being rendered, the computing system entering a "power saving mode" in which the display device 400 is powered off, etc.). As such, the content is rendered by the display device 400 such that individuals in view of the display screen 400 may perceive the content (e.g., determine the status of each of the tasks represented by the content pieces 402-410). However, as described below, at least some individuals (e.g., unauthorized users) are not able to access and/or make any changes to the content.

Figure 5:
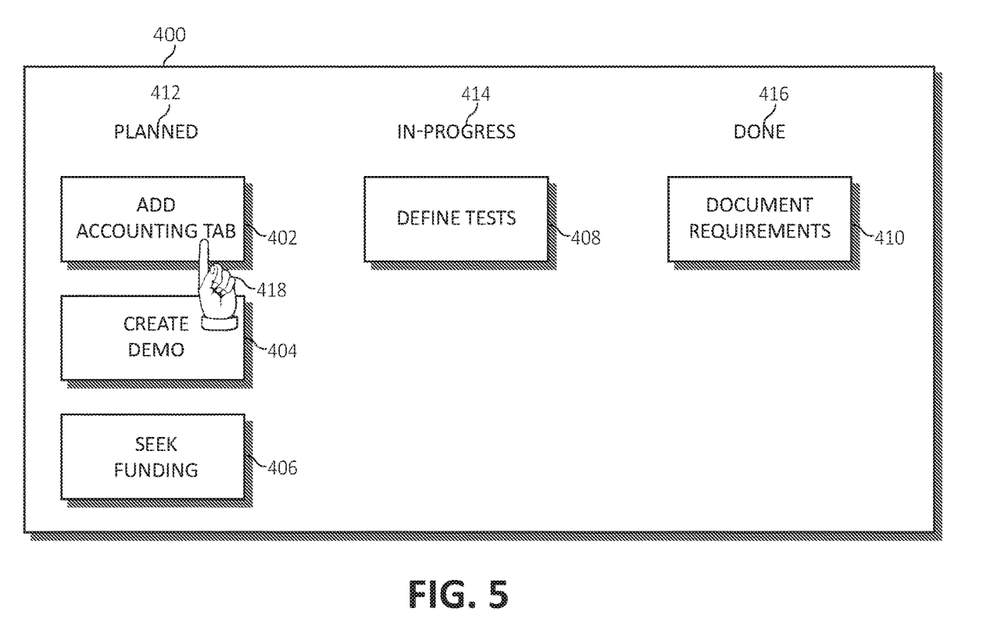

Referring now to FIG. 5, an object is detected within a proximity of the display device 400. In the particular embodiment shown, the object is a hand, or more specifically a finger (of the hand), 418. In FIG. 5, the finger 418 is detected as making contact with (or direct contact with or touching) the display device 400. In the illustrated example, the finger 418 is touching the portion of the display device 400 that is rendering content piece 402.

In some embodiments, after the finger 418 is detected as making contact with the display device 400, a biometric identification process is initiated. As described above, the biometric identification process may include a fingerprint scanning process. In particular, a fingerprint scanning process may be performed utilizing the portion of the display device 400 rendering content piece 402 (i.e., the portion of the display device 400 with which the finger 418 is making contact). The detected characteristics of the fingerprint may be compared to those of fingerprints stored in a database (e.g., on a memory in a security system) to determine whether or not the individual associated with the fingerprint is an authorized user (e.g., authorized personnel of the organization administering/managing the display device 400, such as an employee of a company or some other authorized user).

If the individual is determined to be an authorized user (or a user authorized to access and/or make changes to the content), the display device 400 (and/or the content) is changed to an "unlocked" state, allowing at least some changes to (at least some of) the content (and/or data associated with the content) to be made. In some embodiments, the biometric identification process is performed as quickly as possible given the hardware characteristics of the computing system. As such, in some embodiments, if the individual is determined to be an authorized user, the display device 400 may be unlocked nearly instantaneously (e.g., within a fraction of a second).

Figure 6:
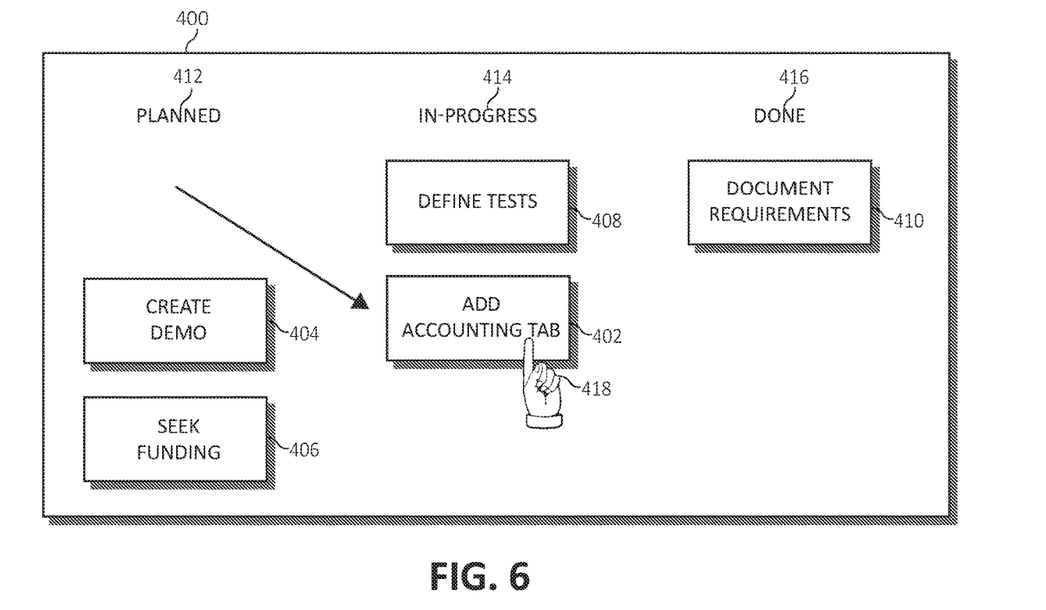

An example of such is shown in FIG. 6, where content piece 402 is "dragged" by the finger 418 from column 412 to column 414, below content piece 408. More specifically, after the finger 418 contacts the portion of the display device 400 rendering content piece 402 and the biometric identification process has indicated that the individual is an authorized user, the individual moves content piece 402 from its position shown in FIG. 5 (i.e., at the top of column 412) to its position shown in FIG. 6 by maintaining contact with the display device 400 and moving the finger 418 across the display device 400 as shown in FIG. 6. It should be noted that in such an embodiment, the display device 400 may remain in the unlocked state so long as the finger maintains contact with the display device 400, thereby retaining the clearance achieved via the biometric identification process.

Figure 7:
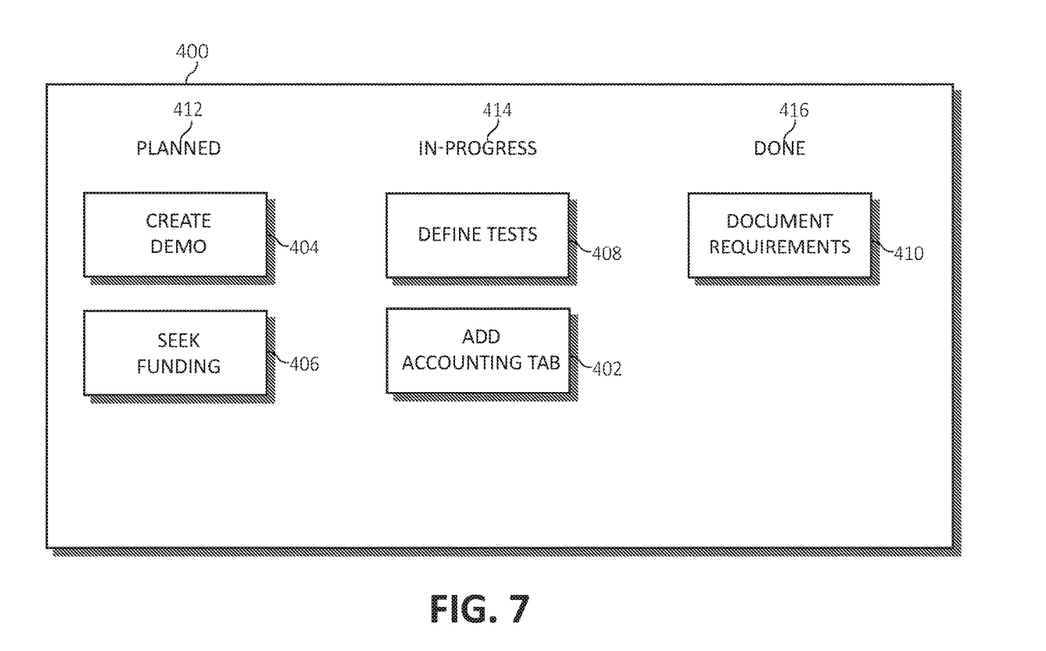

Referring now to FIG. 7, the display device 400 is shown after content piece 402 has been moved to column 414 and the finger 418 has been removed from the display device 400. As alluded to above, in some embodiments, when the finger 418 is detected as being moved away and/or removed from the display device 400, the display device 400 (and/or the content and/or the computing system) returns to the locked state, thereby preventing further changes to the content being made. In some embodiments, the display device 400 is returned to the locked state as quickly as possible given the hardware characteristics of the computing system. As such, in some embodiments, the display device 400 may be "re-locked" nearly instantaneously (e.g., within a fraction of a second) after the finger 418 is detected as being removed from the display device. However, in some embodiments, a delay may be implemented such that the display device 400 remains unlocked for a brief period of time (e.g., the display device 400 is again locked a few seconds after the finger 418 is detected as being removed from the display device 400). It should also be noted that in FIG. 7 content pieces 404 and 406 have been (automatically) moved upwards in column 412 (i.e., to fill the gap formed by moving content piece 402 out of column 412).

Figure 8:
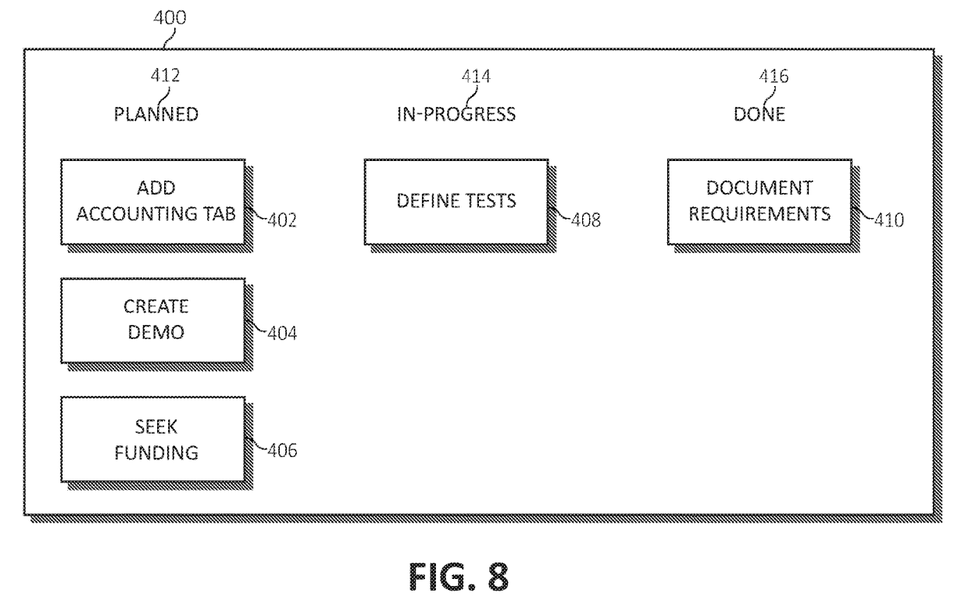
Figure 9:
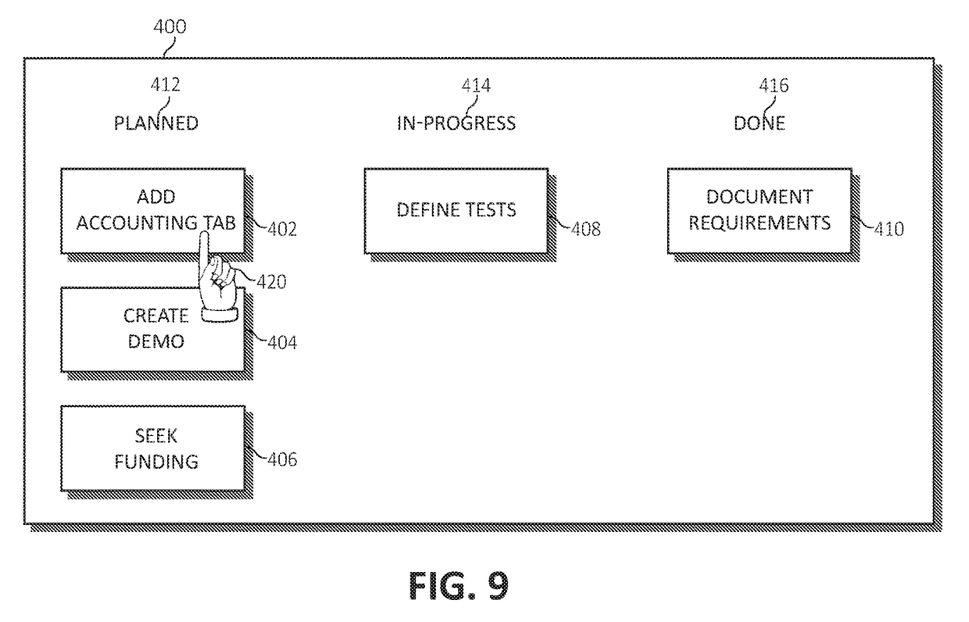
Figure 10:
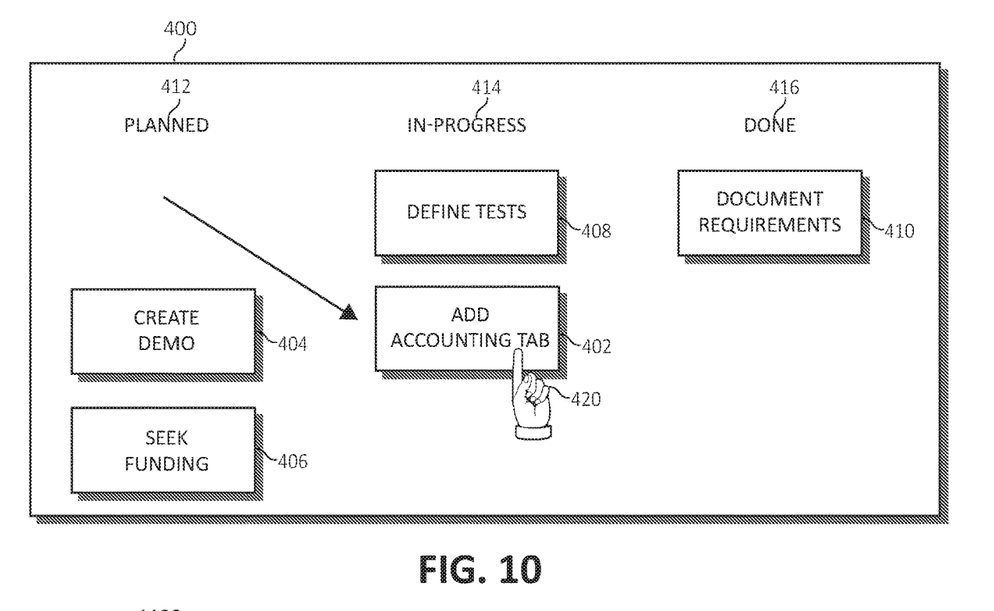

FIG. 8 illustrates the display device 400 in a condition similar to that shown in FIG. 4, with content pieces 402-406 in column 412, content piece 408 in column 414, and content piece 410 in column 416. FIG. 9 illustrates a (second) hand/finger 420 making contact with the portion of the display device 400 rendering content piece 402. In a manner similar to that described above, a biometric identification process (e.g., a fingerprint scan) is then performed on the finger 420 and/or the respective individual. However, for the purposes of this particular example, it should be assumed that the individual has been determined to be an unauthorized user (i.e., an individual that is not authorized to access and/or make changes to the content rendered by the display device 400). As such, the display device 400 and/or the content is not changed to an unlocked state, but rather remains in the locked state. Thus, when the individual attempts to drag content piece 402 from column 412 to column 414, he/she is unable to do so (i.e., content piece 402 does not move across the display device 400 with the finger 420 even if the finger 420 remains in contact with the display device 400), as shown in FIG. 10.

As alluded to above, embodiments described herein may be utilized not just to make changes to content, but also to access content (e.g., applications) on computing systems/devices. For example, referring again to FIGS. 4 and 5, the display device 400 may be a display on a mobile electronic device, such as a mobile phone or tablet, and at least some of the content pieces 402-410 may be, for example, application icons. In such an embodiment, the display device 400 may initially render a screen saver or be in a reduced power consumption mode (e.g., powered down/off). The content shown in FIGS. 4 and 5 may appear when, for example, the device is detected as being moved (e.g., picked up by a user) and/or a button (e.g., a power button) on the device is actuated. The content (and/or the device as a whole) may then be in a locked state, similar to that described above (e.g., the content may not be accessed and/or modified). In some embodiments, when the finger 418 is detected as making contact with the portion of the display device 400 rendering content piece 402, the biometric identification process is performed as described above, and if the individual is determined to be an authorized user, access to the content is granted. For example, if content piece 402 is an application icon, the associated application may be initiated (or "launched") and/or the application icon may be moved in a similar manner described above. In such an embodiment, the user may continue to utilize the application in the usual manner (e.g., until the application is closed). However, in some embodiments, the application may only be used via a similar biometric identification process each time the user attempts to interact with the application (e.g., the fingerprint scan is performed each time the user attempts to interact with the application).

In some embodiments, the portion of the display device 400 utilized to perform the biometric identification process may be different than that used to render the content that is accessed and/or modified. For example, a portion of the display device 400 (e.g., the lower, left corner) may be dedicated to performing fingerprint scans. In such embodiments, the user may contact that portion of the display device 400 with a finger on one of his/her hands (e.g., their left hand), causing the display device 400 to become unlocked (assuming he/she is an authorized user), as described above, then access and/or modify the content with his/her other hand/finger, or utilizing another user input device, such a stylus, keyboard, mouse, microphone, etc.

As such, it should be understood that in some embodiments, the computing system (or device) may be accessed utilizing user input devices other than hands/fingers. For example, the user may contact the display device 400 with a stylus, or perhaps even just sit/stand in a particular location relative to the display device 400, and a different biometric identification process (other than a fingerprint scan) may be performed, such as a face recognition process (e.g., performed utilizing a camera associated with the computing system). Further, it should be understood that in some embodiments, the display device may not be a touchscreen. For example, a dedicated fingerprint or palm scanner (separate from the display device) may be utilized. In such an embodiment, when the user touches the scanner with his/her finger/hand, the computing system may be unlocked, assuming he/she is determined to be an authorized user by the biometric identification process, and he/she may then access/change the content (e.g., at least while his/her finger/hand remains on the scanner).

Additionally, in some embodiments, different users are provided with different clearance/authorization levels. For example, with respect to the embodiment shown in FIGS. 4-10, a first user may only be authorized to move the content pieces 402-410. However, a second user (e.g., an administrator) may be granted additional access and may be able to, for example, power down/off the computing system, change system settings, and/or make specific changes to the content pieces 402-410 (e.g., change the labels, delete, etc.). Further, in some embodiments, multiple users may be able to simultaneously interact with the system. For example, in embodiments utilizing a touchscreen and fingerprint scanning, a first user may contact a first portion of the display device with his/her finger and make changes to (or access) the system as described above, while a second user contacts a second portion of the display device and similarly accesses the system. In such an embodiment, simultaneous contact/authentication of multiple authorized users may be required for any changes (or access) to be made to the system.

Figure 11:
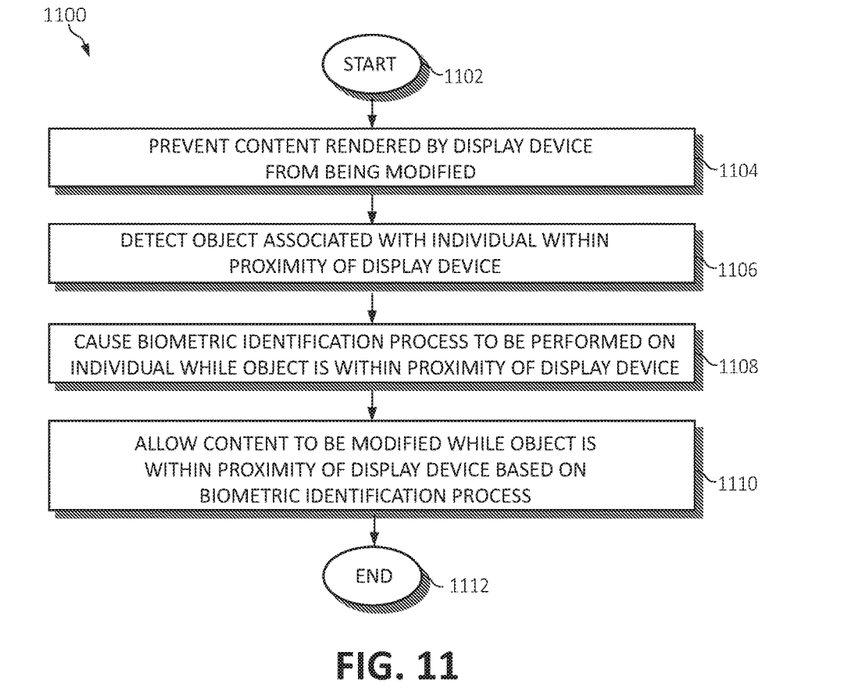
FIG. 11 is a flowchart diagram of an exemplary method for managing computing systems according to an embodiment of the present invention.

Turning to FIG. 11, a flowchart diagram of an exemplary method 1100 for managing computing systems (or devices), according to some embodiments described herein, is provided. Method 1100 begins (step 1102) with, for example, a computing system being utilized to render content, such as by displaying the content on a display device thereof.

The content is prevented from being modified (and/or accessed) (step 1104). That is, the content and/or the computing system may be placed in a locked state, as described above. In some embodiments, while the computing system is in the locked state, at least some of the content is visible on/rendered by the display device.

An object is detected within a proximity of the display device (step 1106). The object may be associated with an individual. For example, the object may be a portion of the body of the individual, such as a hand and/or finger. However, as described above, in some embodiments, the object may be another object, such as a stylus. The object may be detected as being in contact with a portion of the display device. In some embodiments, the object is detected as being in contact with the same portion of the display device rendering the content.

A biometric identification process is caused to be performed on the individual while the object is within the proximity of the display device (step 1108). For example, in embodiments in which the object is a finger, the biometric identification process may include a fingerprint scan. However, as described above, other types of biometric identification processes may be used, such as face recognition, etc.

Based on the biometric identification process, the content is allowed to be modified (and/or accessed) while the object is within the proximity of the display device (step 1110). That is, if the individual is determined to be an authorized user, the computing system (and/or the display device and/or the content) may be placed in an unlocked state, such that the content may be modified (and/or accessed), as described above. For example, the object may be detected as moving from the portion of the display device to a second portion of the display device, which may cause the content to be modified.

Method 1100 ends (step 1112) with, for example, the computing system (and/or the display device and/or the content) being (again) placed in a locked state in response to, for example, the object being detected as moving beyond the proximity of the display device (e.g., being removed from the display device). That is, the content may be re-prevented from being modified after the object is detected as moving beyond the proximity of the display device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing a computing system comprising:
    preventing public informational content continuously rendered by a display device of a computing system from being modified;
    detecting an object in contact with a portion of the display device, wherein the object is associated with an individual;
    causing a biometric identification process to be performed on the individual while the object is in contact with the portion of the display device;
    based on the biometric identification process, allowing the public informational content to be modified only while the object is in contact with the portion of the display device; and
    subsequent to allowing the public informational content to be modified and responsive to detecting the object is no longer in contact with the portion of the display device, re-preventing the public informational content from being modified after the detecting of the object no longer being in contact with the portion of the display device.

2. The method of claim 1, wherein the public informational content is rendered on the portion of the display device.

3. The method of claim 2, further comprising:
    detecting the object moving from the portion of the display device to a second portion of the display device; and
    causing the public informational content to be modified in response to the detecting of the object moving from the portion of the display device to the second portion of the display device.

4. The method of claim 1, wherein the object is a portion of a body of the individual.

5. The method of claim 1, wherein the object is a finger of the individual, and wherein the biometric identification process includes a fingerprint scan.

6. A system for managing a computing system comprising:
    at least one processor that
        prevents public informational content continuously rendered by a display device of a computing system from being modified;
        detects an object in contact with a portion of the display device, wherein the object is associated with an individual;
        causes a biometric identification process to be performed on the individual while the object is in contact with the portion of the display device;
        based on the biometric identification process, allows the public informational content to be modified only while the object is in contact with the portion of the display device; and
        subsequent to allowing the public informational content to be modified and responsive to detecting the object is no longer in contact with the portion of the display device, re-prevents the public informational content from being modified after the detecting of the object no longer being in contact with the portion of the display device.

7. The system of claim 6, wherein the public informational content is rendered on the portion of the display device.

8. The system of claim 7, wherein the at least one processor further:
    detects the object moving from the portion of the display device to a second portion of the display device; and
    causes the public informational content to be modified in response to the detecting of the object moving from the portion of the display device to the second portion of the display device.

9. The system of claim 6, wherein the object is a portion of a body of the individual.

10. The system of claim 6, wherein the object is a finger of the individual, and wherein the biometric identification process includes a fingerprint scan.

11. A computer program product for managing a computing system by one or more processors, the computer program product comprising a non-transitory computer-readable storage medium having computer-readable program code portions stored therein, the computer-readable program code portions comprising:
    an executable portion that prevents public informational content continuously rendered by a display device of a computing system from being modified;
    an executable portion that detects an object in contact with a portion of the display device, wherein the object is associated with an individual;
    an executable portion that causes a biometric identification process to be performed on the individual while the object is in contact with the portion of the display device;
    an executable portion that, based on the biometric identification process, allows the public informational content to be modified only while the object is in contact with the portion of the display device; and an executable portion that, subsequent to allowing the public informational content to be modified and responsive to detecting the object is no longer in contact with the portion of the display device, re-prevents the public informational content from being modified after the detecting of the object no longer being in contact with the portion of the display device.

12. The computer program product of claim 11, wherein the public informational content is rendered on the portion of the display device.

13. The computer program product of claim 12, wherein the computer-readable program code portions further include:

an executable portion that detects the object moving from the portion of the display device to a second portion of the display device; and an executable portion that causes the public informational content to be modified in response to the detecting of the object moving from the portion of the display device to the second portion of the display device.

14. The computer program product of claim 11, wherein the object is a portion of a body of the individual.

15. The computer program product of claim 11, wherein the object is a finger of the individual, and wherein the biometric identification process includes a fingerprint scan.

* * * * *